United States Patent
Hisano et al.

(10) Patent No.: US 9,817,544 B2
(45) Date of Patent: Nov. 14, 2017

(54) DEVICE, METHOD, AND STORAGE MEDIUM STORING PROGRAM

(71) Applicant: KYOCERA CORPORATION, Kyoto-shi, Kyoto (JP)

(72) Inventors: Shuhei Hisano, Kawasaki (JP); Yoshiaki Kondoh, Yokohama (JP); Masamichi Kodama, Machida (JP)

(73) Assignee: KYOCERA CORPORATION, Kyoto (JP)

( * ) Notice: Subject to any disclaimer, the term of this patent is extended or adjusted under 35 U.S.C. 154(b) by 208 days.

(21) Appl. No.: 14/751,271

(22) Filed: Jun. 26, 2015

(65) Prior Publication Data

US 2015/0370448 A1    Dec. 24, 2015

Related U.S. Application Data

(63) Continuation of application No. 13/686,075, filed on Nov. 27, 2012, now Pat. No. 9,086,731.

(30) Foreign Application Priority Data

Nov. 28, 2011  (JP) ................. 2011-259402
Nov. 26, 2012  (JP) ................. 2012-257573

(51) Int. Cl.
 *G06F 3/041*   (2006.01)
 *G06F 3/0481*  (2013.01)
 (Continued)

(52) U.S. Cl.
 CPC .......... *G06F 3/04817* (2013.01); *G06F 3/017* (2013.01); *G06F 3/03545* (2013.01); *G06F 3/0412* (2013.01); *G06F 3/0416* (2013.01); *G06F 3/0488* (2013.01); *G06F 3/04883* (2013.01); *G06F 3/04886* (2013.01); *G06F 3/041* (2013.01); *G06F 2203/04104* (2013.01);
 (Continued)

(58) Field of Classification Search
 CPC ........................................................ G06F 3/041
 USPC .................................................. 345/173–179
 See application file for complete search history.

(56) References Cited

U.S. PATENT DOCUMENTS

| | | | |
|---|---|---|---|
| 7,366,547 B2 | 4/2008 | Hasegawa et al. | |
| 2006/0265653 A1 | 11/2006 | Paasonen et al. | |

(Continued)

FOREIGN PATENT DOCUMENTS

| | | |
|---|---|---|
| CN | 1578324 A | 2/2005 |
| JP | 4036799 B2 | 1/2008 |

(Continued)

OTHER PUBLICATIONS

Office Action in JP Application No. 2012-257573, dated Jul. 5, 2016, for which an explanation of relevance is attached.

(Continued)

*Primary Examiner* — Alexander Eisen
*Assistant Examiner* — Cory Almeida
(74) *Attorney, Agent, or Firm* — Hauptman Ham, LLP

(57) ABSTRACT

According to an aspect, a device includes a touch screen display and a controller. The touch screen display displays a home screen where an icon is arranged. When hen a first gesture is performed on a partial area of the home screen displayed on the touch screen display, the controller enlarges or reduces the area of the home screen to be displayed on the touch screen display.

2 Claims, 9 Drawing Sheets

(51) Int. Cl.
   *G06F 3/01* (2006.01)
   *G06F 3/0488* (2013.01)
   *G06F 3/0354* (2013.01)

(52) U.S. Cl.
   CPC .............. *G06F 2203/04806* (2013.01); *G06F 2203/04808* (2013.01)

(56) References Cited

U.S. PATENT DOCUMENTS

| | | | |
|---|---|---|---|
| 2007/0171192 A1* | 7/2007 | Seo ................... | H04M 1/72544 345/156 |
| 2008/0165160 A1 | 7/2008 | Kocienda et al. | |
| 2009/0064055 A1 | 3/2009 | Chaudhri et al. | |
| 2010/0309147 A1 | 12/2010 | Fleizach et al. | |
| 2011/0145688 A1 | 6/2011 | Han et al. | |
| 2011/0316888 A1* | 12/2011 | Sachs ................... | G06F 1/1626 345/667 |
| 2012/0192110 A1 | 7/2012 | Wu | |

FOREIGN PATENT DOCUMENTS

| | | |
|---|---|---|
| JP | 2008-182761 A | 8/2008 |
| JP | 4153398 B2 | 9/2008 |
| JP | 2009-223902 A | 10/2009 |
| JP | 4454652 B2 | 4/2010 |
| JP | 4454653 B2 | 4/2010 |
| JP | 4454654 B2 | 4/2010 |
| JP | 4454655 B2 | 4/2010 |
| JP | 2010-238249 A | 10/2010 |
| JP | 2011-030254 A | 2/2011 |
| JP | 2011-030255 A | 2/2011 |
| JP | 2011-034573 A | 2/2011 |
| JP | 2011-044157 A | 3/2011 |
| JP | 4688898 B2 | 5/2011 |
| JP | 2011-123897 A | 6/2011 |
| JP | 5620605 B2 | 11/2014 |
| JP | 5620606 B1 | 11/2014 |
| WO | 2008/086302 A1 | 7/2008 |

OTHER PUBLICATIONS

Office Action in JP Application No. 2012-257573, dated Jan. 4, 2017, for which an explanation of relevance is attached.

\* cited by examiner

DEVICE, METHOD, AND STORAGE MEDIUM STORING PROGRAM

CROSS-REFERENCE TO RELATED APPLICATIONS

The present application is a continuation of U.S. patent application Ser. No. 13/686,075, filed on Nov. 27, 2012, which claims priority from Japanese Application No. 2011-259402, filed on Nov. 28, 2011, and Japanese Application No. 2012-257573, filed on Nov. 26, 2012. The contents of the above-listed applications are incorporated by reference herein in their entireties.

BACKGROUND

1. Technical Field

The present application relates to a device, a method, and a storage medium storing therein a program. More particularly, the present application relates to a device including a touch screen, a method of controlling the device, and a storage medium storing therein a program for controlling the device.

2. Description of the Related Art

A touch screen device having a touch screen has been known. Examples of the touch screen devices include, but are not limited to, a smartphone and a tablet. The touch screen device detects a gesture of a finger, a pen, or a stylus pen through the touch screen. Then, the touch screen device operates according to the detected gesture. An example of the operation according to the detected gesture is described in, for example, International Publication Pamphlet No. 2008/086302.

The basic operation of the touch screen device is implemented by an operating system (OS) built into the device. Examples of the OS built into the touch screen device include, but are not limited to, Android, BlackBerry OS, iOS, Symbian OS, and Windows Phone.

Many of the touch screen devices display a screen called "home screen" on a display. Objects called "icons" are arranged on the home screen. When detecting a gesture performed on an icon, the touch screen device executes an application corresponding to the icon on which the gesture is performed.

The more the number of applications installed into the touch screen device increases, the more the number of icons arranged on the home screen increases. An increase in icons makes it difficult for users to find a desired icon.

For these reasons, there is a need for a device, a method, and a program with which the user can easily find a desired one from icons arranged on the home screen.

SUMMARY

According to an aspect, a device includes a touch screen display and a controller. The touch screen display displays a home screen where an icon is arranged. When hen a first gesture is performed on a partial area of the home screen displayed on the touch screen display, the controller enlarges or reduces the area of the home screen to be displayed on the touch screen display.

According to another aspect, a method is for controlling a device with a touch screen display. The method includes: displaying a home screen where an icon is arranged on the touch screen display; and enlarging or reducing, when a first gesture is performed on a partial area of the home screen displayed on the touch screen display, the area of the home screen to be displayed on the touch screen display.

According to another aspect, a non-transitory storage medium stores a program. When executed by a device with a touch screen display, the program causes the device to execute: displaying a home screen where an icon is arranged on the touch screen display; and enlarging or reducing, when a first gesture is performed on a partial area of the home screen displayed on the touch screen display, the area of the home screen to be displayed on the touch screen display.

DETAILED DESCRIPTION

Exemplary embodiments of the present invention will be explained in detail below with reference to the accompanying drawings. A smartphone will be explained below as an example of a device provided with a touch screen.

Figure 1:
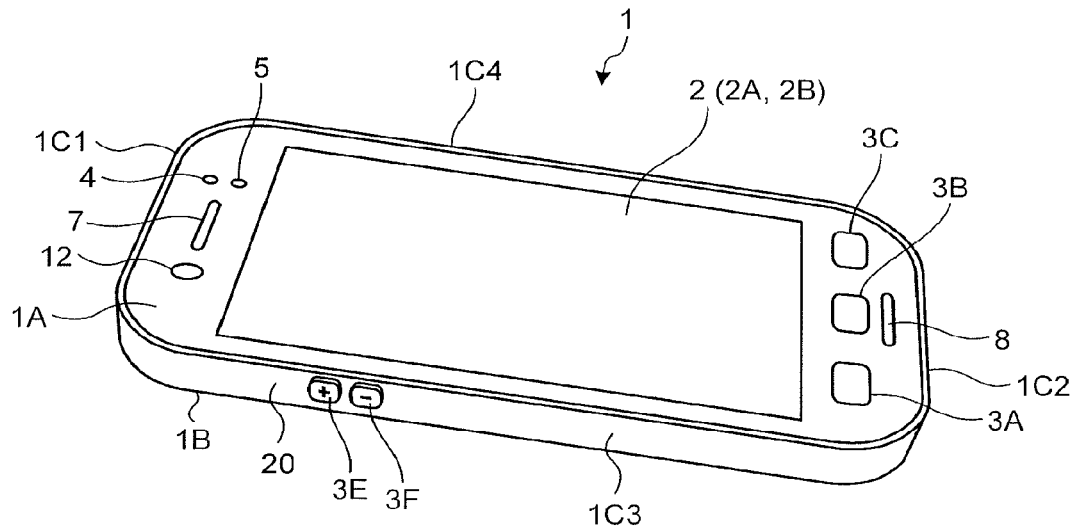
FIG. 1 is a perspective view of a smartphone according to an embodiment.
Figure 2:
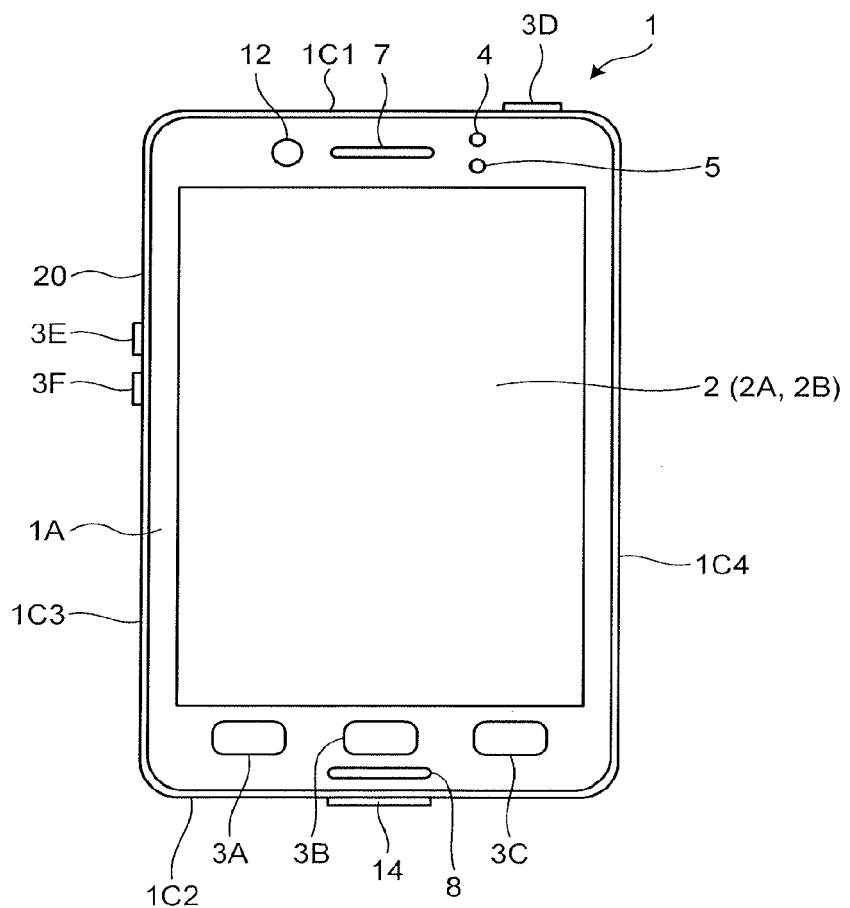
FIG. 2 is a front view of the smartphone.
Figure 3:
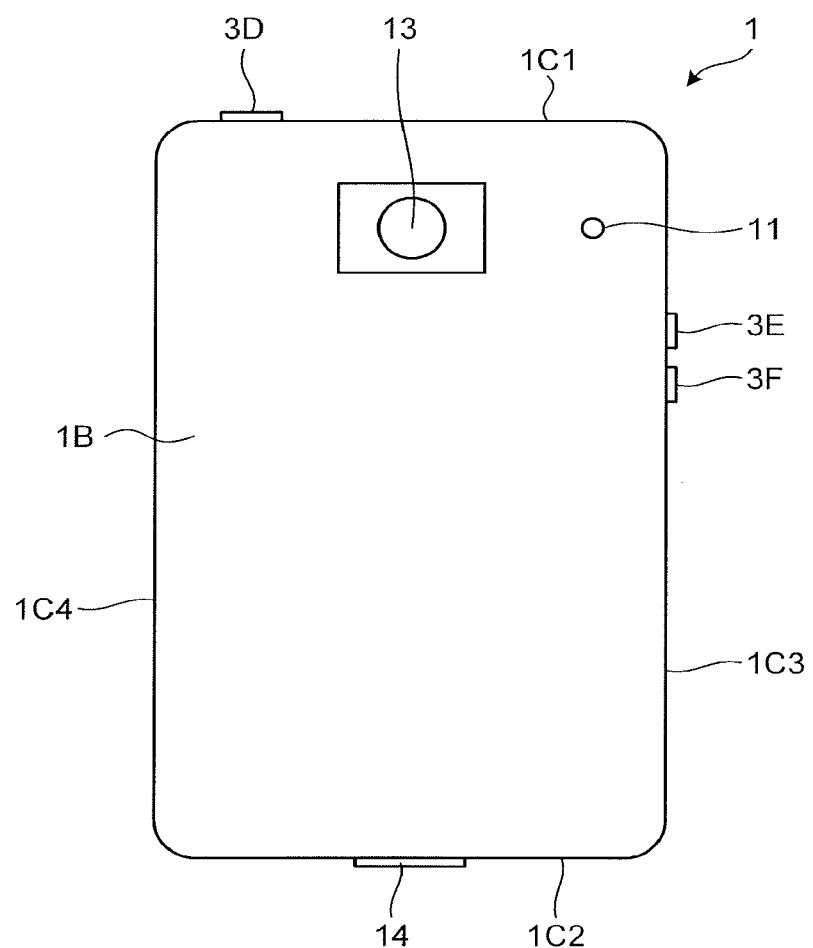
FIG. 3 is a back view of the smartphone.

An overall configuration of a smartphone 1 according to an embodiment will be explained below with reference to FIG. 1 to FIG. 3. As illustrated in FIG. 1 to FIG. 3, the smartphone 1 includes a housing 20. The housing 20 includes a front face 1A, a back face 1B, and side faces 1C1 to 1C4. The front face 1A is a front of the housing 20. The back face 1B is a back of the housing 20. The side faces 1C1 to 1C4 are sides each connecting the front face 1A and the back face 1B. Hereinafter, the side faces 1C1 to 1C4 may be collectively called "side face 1C" without being specific to any of the side faces.

The smartphone 1 includes a touch screen display 2, buttons 3A to 3C, an illumination (ambient light) sensor 4, a proximity sensor 5, a receiver 7, a microphone 8, and a camera 12, which are provided in the front face 1A. The smartphone 1 includes a speaker 11 and a camera 13, which are provided in the back face 1B. The smartphone 1 includes buttons 3D to 3F and a connector 14, which are provided in the side face 1C. Hereinafter, the buttons 3A to 3F may be collectively called "button 3" without being specific to any of the buttons.

The touch screen display 2 includes a display 2A and a touch screen 2B. In the example of FIG. 1, each of the display 2A and the touch screen 2B is approximately rectangular-shaped; however, the shapes of the display 2A and the touch screen 2B are not limited thereto. Each of the display 2A and the touch screen 2B may have any shape such as a square, a circle or the like. In the example of FIG. 1, the display 2A and the touch screen 2B are arranged in a superimposed manner; however, the manner in which the display 2A and the touch screen 2B are arranged is not limited thereto. The display 2A and the touch screen 2B may be arranged, for example, side by side or apart from each other. In the example of FIG. 1, longer sides of the display 2A are along with longer sides of the touch screen 2B respectively while shorter sides of the display 2A are along with shorter sides of the touch screen 2B respectively; however, the manner in which the display 2A and the touch screen 2B are superimposed is not limited thereto. In case the display 2A and the touch screen 2B are arranged in the superimposed manner, they can be arranged such that, for example, one or more sides of the display 2A are not along with any sides of the touch screen 2B.

The display 2A is provided with a display device such as a liquid crystal display (LCD), an organic electro-luminescence display (GELD), or an inorganic electro-luminescence display (IELD). The display 2A displays text, images, symbols, graphics, and the like.

The touch screen 2B detects a contact of a finger, a pen, a stylus pen, or the like on the touch screen 2B. The touch screen 2B can detect positions where a plurality of fingers, pens, stylus pens, or the like make contact with the touch screen 2B. In the description herein below, a finger, pen, stylus pen, and the like may be referred to as a "contact object" or an "object".

The detection method of the touch screen 2B may be any detection methods, including but not limited to, a capacitive type detection method, a resistive type detection method, a surface acoustic wave type (or ultrasonic type) detection method, an infrared type detection method, an electro magnetic induction type detection method, and a load sensing type detection method. In the description herein below, for the sake of simplicity, it is assumed that the user uses his/her finger(s) to make contact with the touch screen 2B in order to operate the smartphone 1.

The smartphone 1 determines a type of a gesture based on at least one of a contact detected by the touch screen 2B, a position where the contact is detected, a change of a position where the contact is detected, an interval between detected contacts, and the number of detection times of the contact. The gesture is an operation performed on the touch screen 2B. Examples of the gestures determined by the smartphone 1 include, but are not limited to, touch, long touch, release, swipe, tap, double tap, long tap, drag, flick, pinch in, and pinch out.

"Touch" is a gesture in which a finger makes contact with the touch screen 2B. The smartphone 1 determines a gesture in which the finger makes contact with the touch screen 2B as touch. "Long touch" is a gesture in which a finger makes contact with the touch screen 2B for longer than a given time. The smartphone 1 determines a gesture in which the finger makes contact with the touch screen 2B for longer than a given time as long touch.

"Release" is a gesture in which a finger separates from the touch screen 2B. The smartphone 1 determines a gesture in which the finger separates from the touch screen 2B as release. "Swipe" is a gesture in which a finger moves on the touch screen 2B with continuous contact thereon. The smartphone 1 determines a gesture in which the finger moves on the touch screen 2B with continuous contact thereon as swipe.

"Tap" is a gesture in which a touch is followed by a release. The smartphone 1 determines a gesture in which a touch is followed by a release as tap. "Double tap" is a gesture such that a gesture in which a touch is followed by a release is successively performed twice. The smartphone 1 determines a gesture such that a gesture in which a touch is followed by a release is successively performed twice as double tap.

"Long tap" is a gesture in which a long touch is followed by a release. The smartphone 1 determines a gesture in which a long touch is followed by a release as long tap. "Drag" is a gesture in which a swipe is performed from an area where a movable-object is displayed. The smartphone 1 determines a gesture in which a swipe is performed from an area where the movable-object displayed as drag.

"Flick" is a gesture in which a finger separates from the touch screen 2B while moving after making contact with the touch screen 2B. That is, "Flick" is a gesture in which a touch is followed by a release accompanied with a movement of the finger. The smartphone 1 determines a gesture in which the finger separates from the touch screen 2B while moving after making contact with the touch screen 2B as flick. The flick is performed, in many cases, with a finger moving along one direction. The flick includes "upward flick" in which the finger moves upward on the screen, "downward flick" in which the finger moves downward on the screen, "rightward flick" in which the finger moves rightward on the screen, "leftward flick" in which the finger moves leftward on the screen, "diagonally left upward flick" in which the finger moves in the diagonally left upward direction on the screen, "diagonally left downward flick" in which the finger moves in the diagonally left downward direction on the screen, "diagonally right upward flick" in which the finger moves in the diagonally right upward direction on the screen, "diagonally right downward flick" in which the finger moves in the diagonally right downward direction on the screen, and the like. Movement of the finger during the flick is, in many cases, quicker than that of the finger during the swipe.

"Pinch in" is a gesture in which a swipe with a plurality of fingers is performed in a direction to move the fingers toward each other. The smartphone 1 determines a gesture in which the distance between a position of one finger and a position of another finger detected by the touch screen 2B becomes shorter as pinch in. "Pinch out" is a gesture in which a swipe with a plurality of fingers is performed in a direction to move the fingers away from each other. The smartphone 1 determines a gesture in which the distance between a position of one finger and a position of another finger detected by the touch screen 2B becomes longer as pinch out.

In the description herein below, a gesture performed by using a finger may be referred to as a "single touch gesture", and a gesture performed by using a plurality of fingers may be referred to as a "multi touch gesture". Examples of the multi touch gesture include a pinch in and a pinch out. A tap, a flick, a swipe, and the like are a single touch gesture when performed by using a finger, and are a multi touch gesture when performed by using a plurality of fingers.

The smartphone 1 performs operations according to these gestures which are determined through the touch screen 2B. Therefore, user-friendly and intuitive operability is achieved. The operations performed by the smartphone 1 according to the determined gestures may be different depending on the screen displayed on the display 2A. In the following explanation, for the sake of simplicity of explanation, the fact that the touch screen detects the contact(s) and then the smartphone determines the type of the gesture as X based on the contact(s) may be simply described as "the smartphone detects X" or "the controller detects X".

The smartphone 1 detects value of the operations in these gestures which are determined through the touch screen 2B.

For example, the smartphone 1 detects a change in a position of one finger with respect to a position of another finger, thereby detecting a value of the operation in pinch in or pinch out. Specifically, when a value of the operation in pinch in is to be detected, first of all, the smartphone 1 measures a first distance between positions of both fingers based on positions of the both fingers that come in contact with the touch screen 2B. Then, the smartphone 1 measures a second distance between positions of the both fingers based on positions of the one finger and the other finger that are moved closer to each other. The smartphone 1 detects a difference between the first distance and the second distance as a value of the operation in pinch in. When the difference between the first distance and the second distance is large, a large value of the operation in the pinch in is detected. When the difference between the first distance and the second distance is small, a small value of the operation in the pinch in is detected. When a value of the operation in pinch out is to be detected, first of all, the smartphone 1 measures a first distance between positions of both fingers based on positions of the both fingers that come in contact with the touch screen 2B. Then, the smartphone 1 measures a third distance between positions of the both fingers based on positions of the one finger and the other finger that are moved apart from each other. The smartphone 1 detects a difference between the third distance and the first distance as a value of the operation in pinch out. When the difference between the third distance and the first distance is large, a large value of the operation in the pinch out is detected. When the difference between the third distance and the first distance is small, a small value of the operation in the pinch out is detected.

For example, the smartphone 1 detects a change in a movement distance of a finger, thereby detecting a value of the operation in swipe. Specifically, when a value of the operation in swipe is to be detected, the smartphone 1 detects a movement distance, as a value of the operation in swipe, along which the finger is moved in continuous contact with the touch screen 2B from a position of the finger that comes in contact with the touch screen 2B. When the movement distance is long, then a large value of the operation in the swipe is detected. When the movement distance is short, then a small value of the operation in the swipe is detected. For example, the smartphone 1 detects a change in a movement speed of a finger, thereby detecting a value of the operation in flick. Specifically, when a value of the operation in flick is to be detected, the smartphone 1 detects a movement speed of the finger, as a value of the operation in flick, from moving of the finger in continuous contact with the touch screen 2B to releasing thereof. When the movement speed is high, then a large value of the operation in the flick is detected. When the movement speed is low, then a small value of the operation in the flick is detected.

Figure 4:
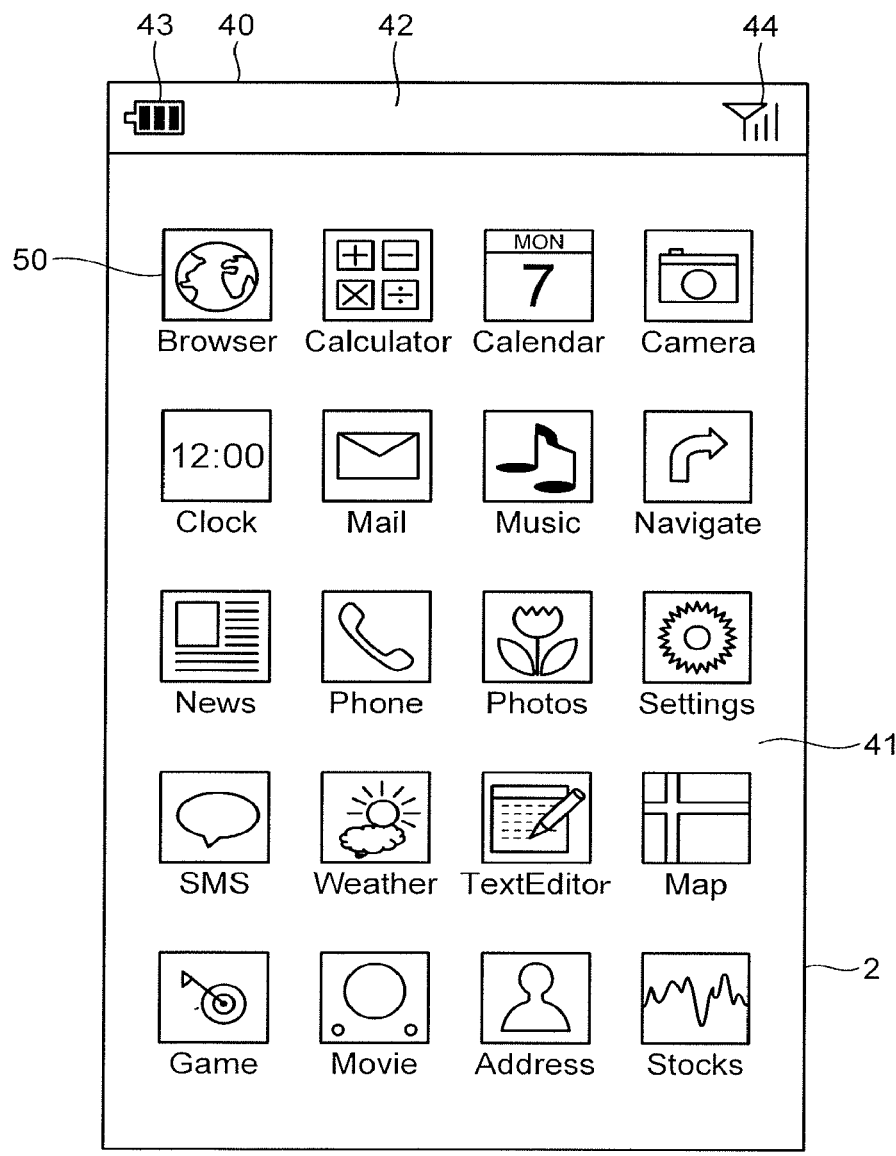
FIG. 4 is a diagram illustrating an example of a home screen.

An example of the screen displayed on the display 2A will be explained below with reference to FIG. 4. FIG. 4 represents an example of a home screen. The home screen may also be called "desktop", "standby screen", "idle screen", or "standard screen". The home screen is displayed on the display 2A. The home screen is a screen allowing the user to select which one of applications (programs) installed in the smartphone 1 is executed. The smartphone 1 executes the application selected on the home screen in the foreground. The screen of the application executed in the foreground is displayed on the display 2A.

Icons can be arranged on the home screen of the smartphone 1. A plurality of icons 50 are arranged on a home screen 40 illustrated in FIG. 4. Each of the icons 50 is previously associated with an application installed in the smartphone 1. When detecting a gesture for an icon 50, the smartphone 1 executes the application associated with the icon 50 for which the gesture is detected. For example, when detecting a tap on an icon 50 associated with a mail application, the smartphone 1 executes the mail application.

The icons 50 include an image and a character string. The icons 50 may contain a symbol or a graphic instead of an image. The icons 50 do not have to include either one of the image and the character string. The icons 50 are arranged based on a layout pattern. A wall paper 41 is displayed behind the icons 50. The wall paper may sometimes be called "photo screen", "back screen", "idle image", or "background image". The smartphone 1 can use an arbitrary image as the wall paper 41. The smartphone 1 may be configured so that the user can select an image to be displayed as the wall paper 41.

An area 42 is provided along the top edge of the display 2A. Displayed on the area 42 are a remaining mark 43 indicating a remaining amount of a power supply and a radio-wave level mark 44 indicating an electric field strength of radio wave for communication. The smartphone 1 may display time, weather, an application during execution thereof, a type of communication system, a status of a phone call, a mode of the device, an event occurring in the device, and the like in the area 42. In this manner, the area 42 is used to inform the user of various notifications. The area 42 may be provided on any screen other than the home screen 40. A position where the area 42 is provided is not limited to the top edge of the display 2A.

In the following explanation, the vertical direction of the home screen 40 is determined based on a vertical direction of text or an image displayed on the touch screen display 2. Therefore, in the home screen 40 illustrated in FIG. 4, the side close to the area 42 in the longitudinal direction of the touch screen display 2 is the upper side, and the side far from the area 42 is the lower side. The side with the radio-wave level mark 44 displayed in the area 42 is the right side of the home screen 40, and the side with the remaining mark 43 displayed in the area 42 is the left side of the home screen 40. The smartphone 1 determines, based on a vertical direction of text or an image displayed on the touch screen display 2, directions of the home screen 40, such as the diagonally left upward direction, the diagonally right downward direction, the left direction, the right direction, etc.

The home screen 40 illustrated in FIG. 4 is only an example, and therefore the configuration of each of elements, the arrangement of the elements, the number of home screens 40, the way to perform each of operations on the home screen 40, and the like do not have to be like the above mentioned explanation.

Figure 5:
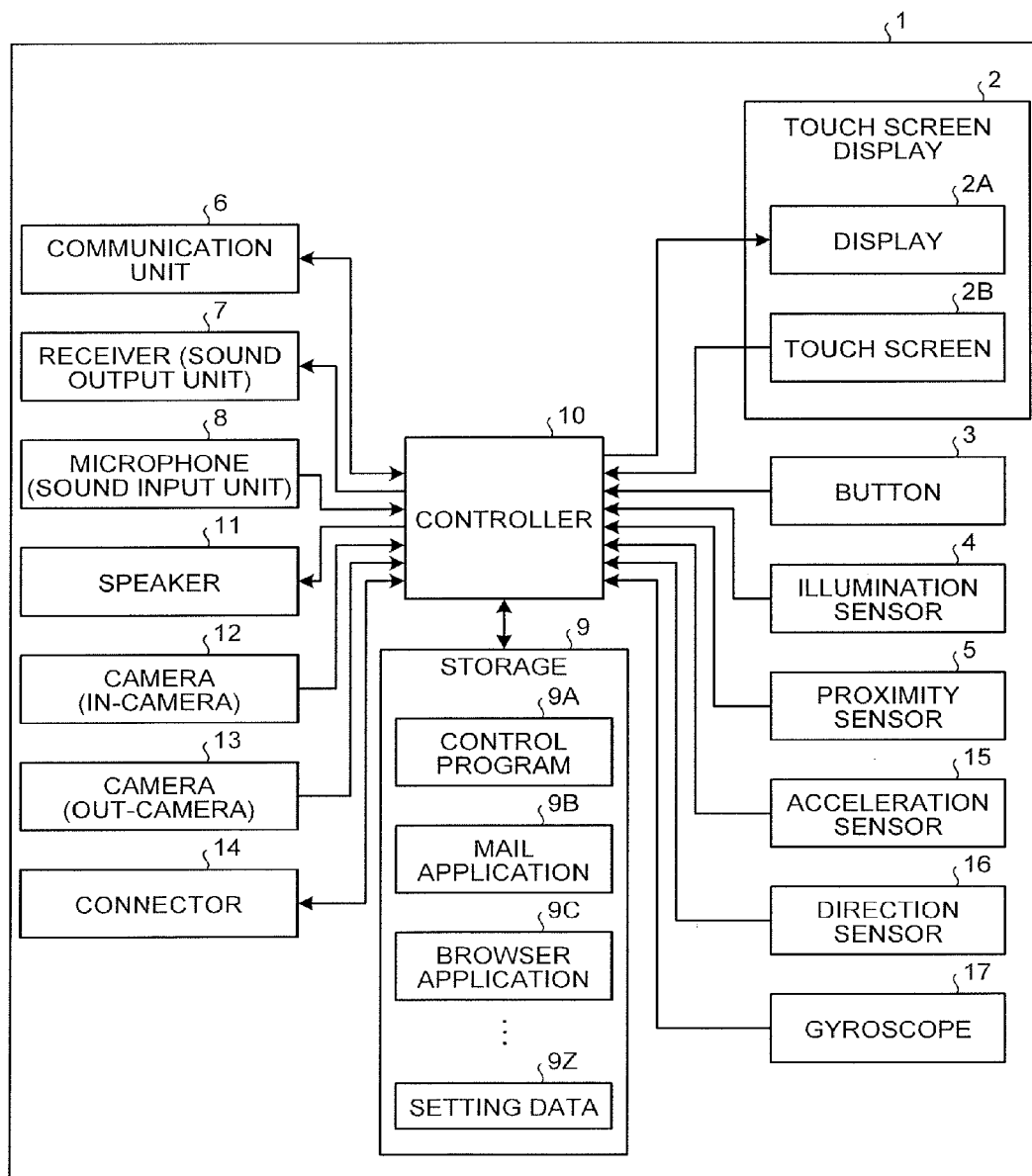
FIG. 5 is a block diagram of functions of the smartphone.

FIG. 5 is a block diagram of the smartphone 1. The smartphone 1 includes the touch screen display 2, the button 3, the illumination sensor 4, the proximity sensor 5, a communication unit 6, the receiver 7, the microphone 8, a storage 9, a controller 10, the speaker 11, the cameras 12 and 13, the connector 14, an acceleration sensor 15, a direction (orientation) sensor 16, and a gyroscope 17.

The touch screen display 2 includes, as explained above, the display 2A and the touch screen 2B. The display 2A displays text, images, symbols, graphics, or the like. The touch screen 2B detects contact(s). The controller 10 detects a gesture performed for the smartphone 1. Specifically, the controller 10 detects an operation (a gesture) for the touch screen 2B in cooperation with the touch screen 2B.

The button 3 is operated by the user. The button 3 includes buttons 3A to 3F. The controller 10 detects an operation for the button 3 in cooperation with the button 3. Examples of the operations for the button 3 include, but are not limited to, a click, a double click, a triple click, a push, and a multi-push.

The buttons 3A to 3C are, for example, a home button, a back button, or a menu button. The button 3D is, for example, a power on/off button of the smartphone 1. The button 3D may function also as a sleep/sleep release button. The buttons 3E and 3F are, for example, volume buttons.

The illumination sensor 4 detects illumination of the ambient light of the smartphone 1. The illumination indicates intensity of light, lightness, or brightness. The illumination sensor 4 is used, for example, to adjust the brightness of the display 2A. The proximity sensor 5 detects the presence of a nearby object without any physical contact. The proximity sensor 5 detects the presence of the object based on a change of the magnetic field, a change of the return time of the reflected ultrasonic wave, etc. The proximity sensor 5 detects that, for example, the touch screen display 2 is brought close to someone's face. The illumination sensor 4 and the proximity sensor 5 may be configured as one sensor. The illumination sensor 4 can be used as a proximity sensor.

The communication unit 6 performs communication via radio waves. A communication system supported by the communication unit 6 is wireless communication standard. The wireless communication standard includes, for example, a communication standard of cellar phones such as 2G, 3G, and 4G. The communication standard of cellar phones includes, for example, Long Term Evolution (LTE), Wideband Code Division Multiple Access (W-CDMA), CDMA 2000, a Personal Digital Cellular (PDC), a Global System for Mobile Communications (GSM), and a Personal Handy-phone System (PHS). The wireless communication standard further includes, for example, Worldwide Interoperability for Microwave Access (WiMAX), IEEE 802.11, Bluetooth, Infrared Data Association (IrDA), and Near Field Communication (NFC). The communication unit 6 may support one or more communication standards.

The receiver 7 and the speaker 11 are sound output units. The receiver 7 and the speaker 11 output a sound signal transmitted from the controller 10 as sound. The receiver 7 is used, for example, to output voice of the other party on the phone. The speaker 11 is used, for example, to output a ring tone and music. Either one of the receiver 7 and the speaker 11 may double as the other function. The microphone 8 is a sound input unit. The microphone 8 converts speech of the user or the like to a sound signal and transmit the converted signal to the controller 10.

The storage 9 stores therein programs and data. The storage 9 is used also as a work area that temporarily stores a processing result of the controller 10. The storage 9 may include any non-transitory storage medium such as a semiconductor storage medium and a magnetic storage medium. The storage 9 may include a plurality type of storage mediums. The storage 9 may include a combination of a portable storage medium such as a memory card, an optical disc, or a magneto-optical disc with a reader of the storage medium. The storage 9 may include a storage device used as a temporary storage area such as Random Access Memory (RAM).

Programs stored in the storage 9 include applications executed in the foreground or the background and a control program for assisting operations of the applications. The application causes the controller 10, for example, to display a screen on the display 2A and perform a process according to a gesture detected through the touch screen 2B. The control program is, for example, an OS. The applications and the control program may be installed in the storage 9 through communication by the communication unit 6 or through a non-transitory storage medium.

The storage 9 stores therein, for example, a control program 9A, a mail application 9B, a browser application 9C, and setting data 9Z. The mail application 9B provides an e-mail function. The e-mail function allows composition, transmission, reception, and display of e-mail, and the like. The browser application 9C provides a WEB browsing function. The WEB browsing function allows display of WEB pages, edit of a book mark, and the like. The setting data 9Z provides a function for various settings related to the operations of the smartphone 1.

The control program 9A provides a function related to various controls for operating the smartphone 1. The control program 9A controls, for example, the communication unit 6, the receiver 7, and the microphone 8 to make a phone call. The function provided by the control program 9A includes a function for changing the home screen 40 to be displayed according to a gesture. Examples of the function for changing the home screen 40 to be displayed according to a gesture include, but not limited to, functions for enlarging, reducing, and moving a display area with respect to the home screen 40 to be displayed according to a gesture. The function provided by the control program 9A can be used in combination with a function provided by the other program such as the mail application 9B.

The controller 10 is a processing unit. Examples of the processing units include, but are not limited to, a Central Processing Unit (CPU), System-on-a-chip (SoC), a Micro Control Unit (MCU), and a Field-Programmable Gate Array (FPGA). The controller 10 integrally controls the operations of the smartphone 1 to implement various functions.

Specifically, the controller 10 executes instructions contained in the program stored in the storage 9 while referring to the data stored in the storage 9 as necessary. The controller 10 controls a function unit according to the data and the instructions to thereby implement the various functions. Examples of the function units include, but are not limited to, the display 2A, the communication unit 6, the receiver 7, and the speaker 11. The controller 10 can change the control of the function unit according to the detection result of a detector. Examples of the detectors include, but are not limited to, the touch screen 2B, the button 3, the illumination sensor 4, the proximity sensor 5, the microphone 8, the camera 12, the camera 13, the acceleration sensor 15, the direction sensor 16, and the gyroscope 17.

The controller 10 executes, for example, the control program 9A to perform various controls, such as a control for enlarging, reducing, and moving a display area with respect to the home screen 40 to be displayed according to a gesture.

The camera 12 is an in-camera for photographing an object facing the front face 1A. The camera 13 is an out-camera for photographing an object facing the back face 1B.

The connector 14 is a terminal to which other device is connected. The connector 14 may be a general-purpose terminal such as a Universal Serial Bus (USB), a High-Definition Multimedia Interface (HDMI), Light Peak (Thunderbolt), and an earphone/microphone connector. The connector 14 may be a dedicated terminal such as a dock connector. Examples of the devices connected to the connector 14 include, but are not limited to, an external storage device, a speaker, and a communication device.

The acceleration sensor 15 detects a direction and a magnitude of acceleration applied to the smartphone 1. The direction sensor 16 detects a direction of geomagnetism. The gyroscope 17 detects an angle and an angular velocity of the smartphone 1. The detection results of the acceleration sensor 15, the direction sensor 16, and the gyroscope 17 are used in combination with each other in order to detect a position of the smartphone 1 and a change of its attitude.

Part or all of the programs and the data stored in the storage 9 in FIG. 5 may be downloaded from any other device through communication by the communication unit 6. Part or all of the programs and the data stored in the storage 9 in FIG. 5 may be stored in the non-transitory storage medium that can be read by the reader included in the storage 9. Part or all of the programs and the data stored in the storage 9 in FIG. 5 may be stored in the non-transitory storage medium that can be read by a reader connected to the connector 14. Examples of the non-transitory storage mediums include, but are not limited to, an optical disc such as CD, DVD, and Blu-ray, a magneto-optical disc, magnetic storage medium, a memory card, and solid-state storage medium.

The configuration of the smartphone 1 illustrated in FIG. 5 is only an example, and therefore it can be modified as required within a scope that does not depart from the gist of the present invention. For example, the number and the type of the button 3 are not limited to the example of FIG. 5. The smartphone 1 may be provided with buttons of a numeric keypad layout or a QWERTY layout and so on as buttons for operation of the screen instead of the buttons 3A to 3C. The smartphone 1 may be provided with only one button to operate the screen, or with no button. In the example of FIG. 5, the smartphone 1 is provided with two cameras; however, the smartphone 1 may be provided with only one camera or with no camera. In the example of FIG. 5, the smartphone 1 is provided with three types of sensors in order to detect its position and attitude; however, the smartphone 1 does not have to be provided with some of the sensors. Alternatively, the smartphone 1 may be provided with any other type of sensor for detecting at least one of the position and the attitude.

Control examples of changing the home screen 40 to be displayed by its enlargement, reduction, or movement according to a user's gesture performed on the touch screen display will be represented below with reference to FIG. 6 to FIG. 9.

The home screen 40 according to the present embodiment is configured as a single home screen. The touch screen display 2 illustrated in FIG. 4 displays a display area (i.e. an area, of the home screen 40, displayed on the touch screen display 2) being part of the whole area of the home screen 40. That is, the smartphone 1 displays the display area which is a partial area of the home screen 40 on the touch screen display 2. The display area of the home screen 40 (which can be called a display area with respect to the home screen 40) means a partial area, of the home screen 40, displayed on the touch screen display 2. The smartphone 1 changes the size of the display area with respect to the home screen 40 by enlarging or reducing the display area thereof, and changes a proportion of the home screen 40 to be displayed on the touch screen display 2. The smartphone 1 sets an area, where the home screen 40 is displayed, on the display surface of the display 2A to be basically constant. Therefore, when the display area of the home screen 40 is enlarged, then the proportion of the area of the home screen 40 displayed on the display 2A increases but the size of the display 2A, on which the home screen 40 is displayed, does not change. Therefore, because the display area is increased with respect to a predetermined size, each image of elements included in the display area becomes small. When the display area of the home screen 40 is reduced, the proportion of the area of the home screen 40 to be displayed on the display 2A decreases, but the size of the display 2A, on which the home screen 40 is displayed, does not change. Therefore, because the display area is reduced with respect to the predetermined size, each image of elements included in the display area increases. In this way, by enlarging or reducing the display area of the home screen 40, the smartphone 1 enlarges or reduces the size of part of the home screen 40 displayed on the display 2A, that is, the size of a text of an icon 50, to reduce or increase the number of icons 50 to be displayed.

Furthermore, the smartphone 1 can change the number of icons 50 to be displayed on the display 2A. The smartphone 1 changes the area of the home screen 40 to be displayed on the display 2A by moving the display area of the home screen 40. Because the smartphone 1 is configured to move the display area of the home screen 40, the smartphone 1 allows the whole area of the home screen 40 to be gradually displayed on the display 2A even if the home screen 40 is larger than the display 2A. In this way, the smartphone 1 can gradually display the whole area of the home screen 40 on the display 2A by enlarging, reducing, or moving the display area of the home screen 40.

In the present embodiment, it is assumed that 80 icons 50 are actually arranged in 8 columns×10 rows on one home screen 40. That is, in the example illustrated in FIG. 4, the smartphone 1 reduces the display area of the one home screen 40, on which 80 icons are actually arranged, than the whole area of the home screen 40, and displays the display area including 20 icons being part of the home screen 40 on the display 2A.

Figure 6:
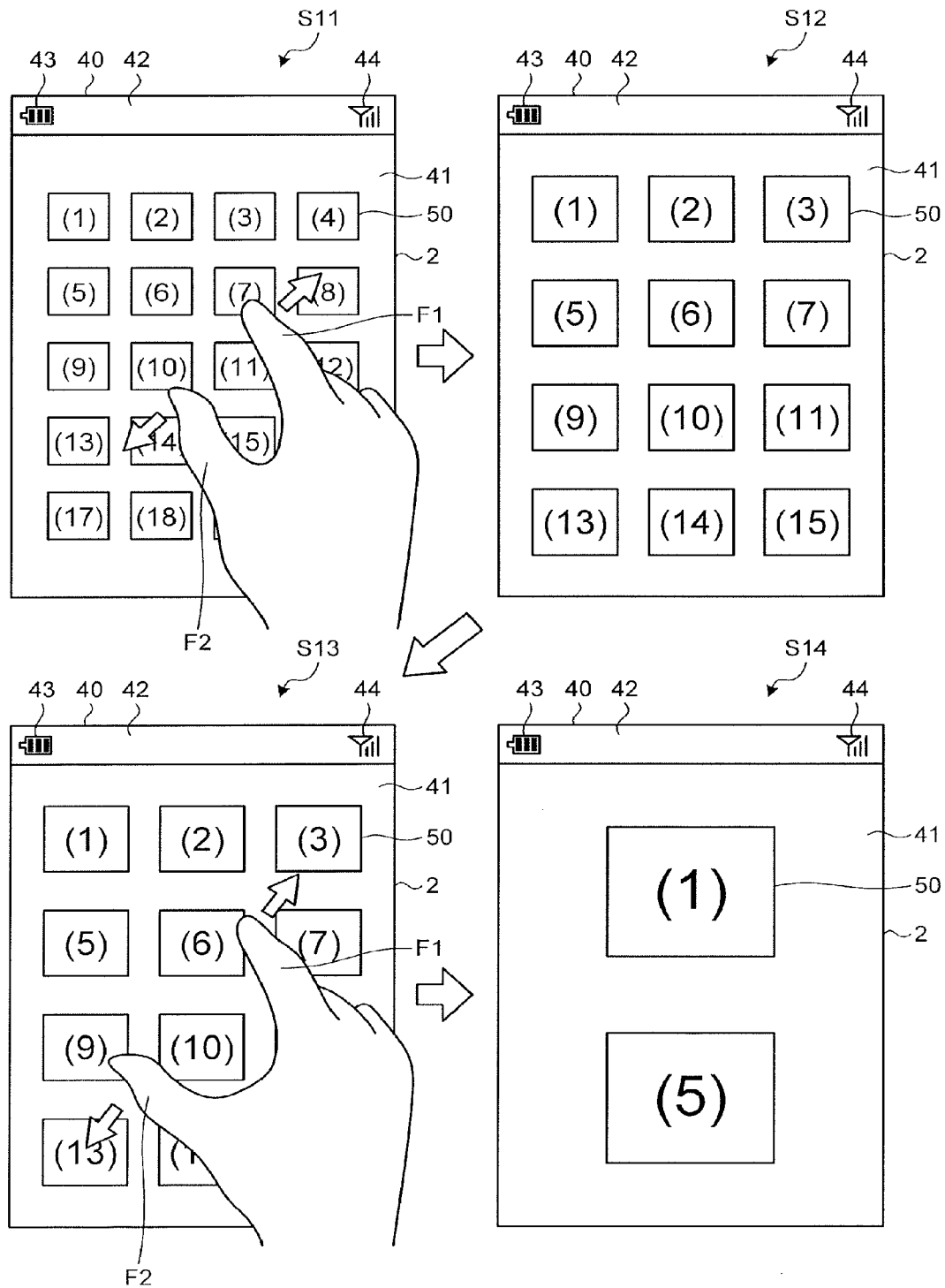
FIG. 6 is a diagram illustrating a first example of control performed by the smartphone.

FIG. 6 is a diagram illustrating a first example of control performed by the smartphone 1. At Step S11, the smartphone 1 displays the home screen 40 with 20 icons arranged in 4 columns×5 rows the same as that of FIG. 4 on the display 2A. In the followings, for the sake of simple explanation, 20 icons from an icon (1) to an icon (20) are represented as the 20 icons from "Browser" icon to "Stocks" icon illustrated in FIG. 4 respectively. At Step S11, the user performs a pinch-out gesture in a direction to move user's fingers F1 and F2 away from each other. The smartphone 1 detects a value of the operation in the pinch-out gesture performed by the user.

At Step S12, the smartphone 1 reduces the display area of the home screen 40 according to the value of the operation in the pinch-out gesture detected at Step S11. At Step S12, the display area of the home screen 40 is reduced more than that of Step S11, so that the number of icons 50 is reduced from 20 icons arranged in 4 columns×5 rows at Step S11 to 12 icons arranged in 3 columns×4 rows. At the same time, at Step S12, the display size of the icons 50 at Step S12 is enlarged as compared with the display size of the icons 50 at Step S11.

At Step S13, the smartphone 1 displays the home screen 40, on the display 2A, on which 12 icons 50 are arranged in 3 columns×4 rows the same as that of Step S12. At Step S13, the user performs a pinch-out gesture in a direction to move the user's fingers F1 and F2 further away from each other as compared with that of Step S11. The smartphone 1 detects a value of the operation in the pinch-out gesture performed by the user. At Step S13, the smartphone 1 detects a value of the operation in the pinch-out gesture which is larger than the value of the operation in the pinch-out gesture detected at Step S11.

At Step S14, the smartphone 1 further reduces the display area of the home screen 40 according to the value of the operation in the pinch-out gesture detected at Step S13. At Step S14, the display area of the home screen 40 is further reduced than that of Step S13, so that the number of icons 50 is reduced from 12 icons arranged in 3 columns×4 rows at Step S13 to 2 icons arranged in 1 column×2 rows. At the same time, at Step S14, the display size of the icons 50 at Step S14 is further enlarged as compared with the display size of the icons 50 at Step S13.

The smartphone 1 reduces the display area of the home screen 40 according to the value of the operation in the pinch-out gesture performed on the home screen 40 at Steps S11 to S14. The smartphone 1 reduces the display area of the home screen 40 while maintaining the layout pattern of the icons 50 within the home screen 40. The smartphone 1 reduces the display area of the home screen 40 while adjusting the display so as not to display the icons 50 partially but to display the whole of the icons 50. Based on this, by reducing the display area of the home screen 40, the smartphone 1 can reduce the number of icons 50 to be displayed and enlarge the display size of the icons 50. Accordingly, the user can limit the number of icons 50 to be looked up and check the detail in the display size of icons 50 set so that the user can easily view. As a result, the user can easily find a desired icon 50.

The first example has explained the case in which the value of the operation in the pinch-out gesture detected at Step S13 is larger than that of Step S11. However, at Step S13, the smartphone 1 may detect a value of the operation in the pinch-out gesture which is about the same amount as that of Step S11. In this case, at Step S14, the number of icons 50 is reduced from 12 icons arranged in 3 columns×4 rows at Step S13 to 6 icons arranged in 2 columns×3 rows.

Figure 7:
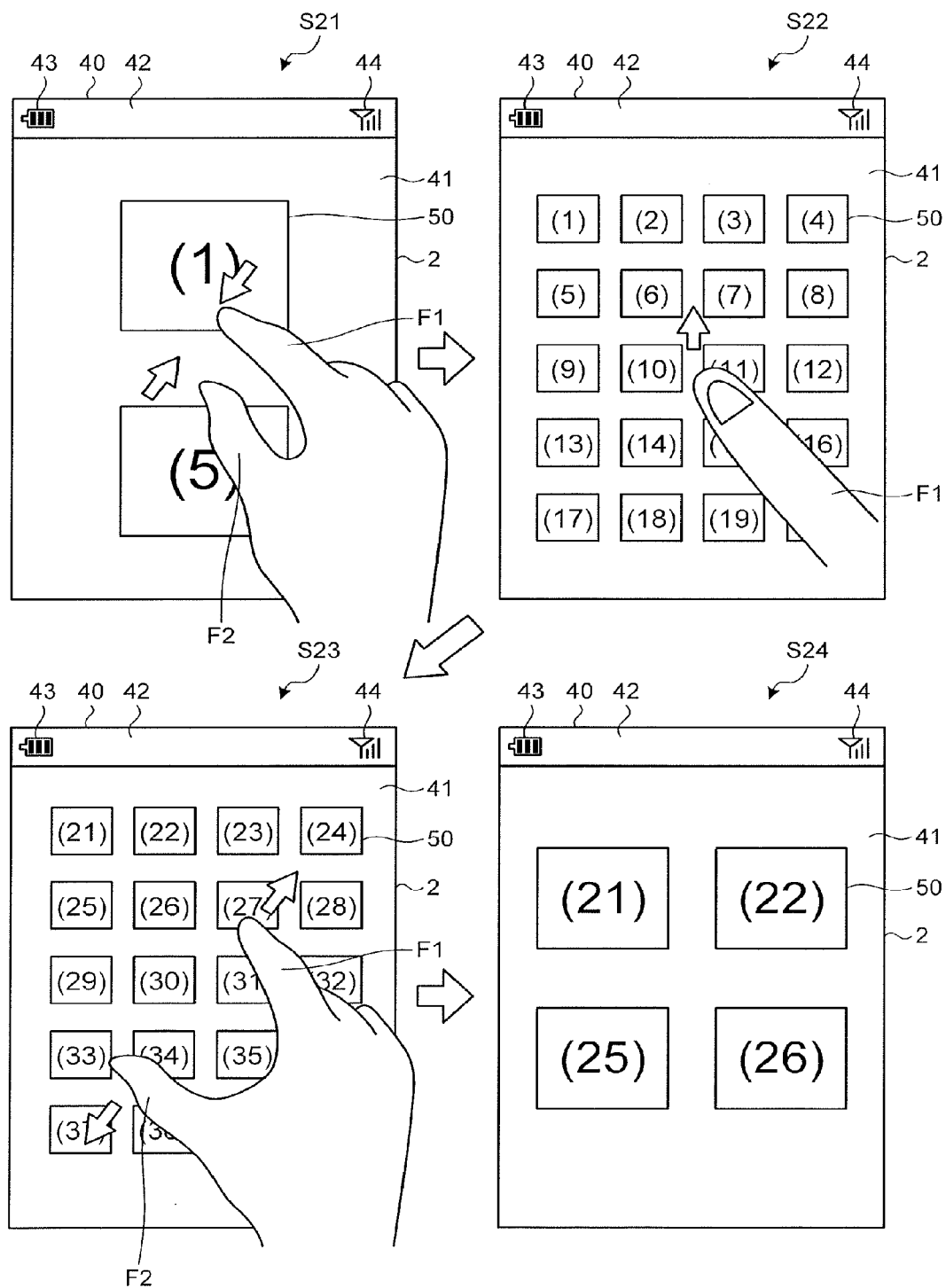
FIG. 7 is a diagram illustrating a second example of the control performed by the smartphone.

FIG. 7 is a diagram illustrating a second example of the control performed by the smartphone 1. At Step S21, the smartphone 1 displays the home screen 40 where 2 icons are arranged in 1 column×2 rows the same as that of Step S14 in FIG. 6 on the display 2A. At Step S21, the user performs a pinch-in gesture in a direction to move the finger F1 and the finger F2 closer to each other. The smartphone 1 detects a value of the operation in the pinch-in gesture performed by the user.

At Step S22, the smartphone 1 enlarges the display area of the home screen 40 according to the value of the operation in the pinch-in gesture detected at Step S21. At Step S22, the display area of the home screen 40 is enlarged more than that of Step S21, and the number of icons 50 is increased from 2 icons arranged in 1 column×2 rows at Step S21 to 20 icons arranged in 4 columns×5 rows. At the same time, at Step S22, the display size of the icons 50 at Step S22 is reduced as compared with the display size of the icons 50 at Step S21.

At Step S22, the user flicks the finger F1 upward on the home screen 40. When detecting the upward flick performed on the home screen 40, the smartphone 1 moves downward the display area of the home screen 40 sheet by sheet (in FIG. 7, "sheet", which may be referred as "page", is set so as to include 20 icons 50 as a unit of 4 columns×5 rows), each of sheet corresponding to the size of the display area of the home screen 40 at Step S22, according to the value of the operation in the detected upward flick gesture.

At Step S23, the smartphone 1 displays the home screen 40 in which the display area of the home screen 40 is moved downward sheet by sheet which is set so as to include 20 icons 50 as a unit of 4 columns×5 rows. The home screen 40 at Step S23 displays 20 icons (21) to (40) which are different from the icons (1) to (20) at Step S22.

At Step S23, the user performs a pinch-out gesture in a direction to move the finger F1 and the finger F2 away from each other. The smartphone 1 detects a value of the operation in the pinch-out gesture performed by the user.

At Step S24, the smartphone 1 reduces the display area of the home screen 40 according to the value of the operation in the pinch-out gesture detected at Step S23. At Step S24, the display area of the home screen 40 is reduced more than that of Step S23, and the number of icons 50 is reduced from 20 icons arranged in 4 columns×5 rows at Step S23 to 4 icons arranged in 2 columns×2 rows. At the same time, at Step S24, the display size of the icons 50 at Step S24 is enlarged as compared with the display size of the icons 50 at Step S23.

The smartphone 1 enlarges the display area of the home screen 40 at Steps S21 to S22 according to the value of the operation in the pinch-in gesture performed on the home screen 40. By enlarging the display area of the home screen 40, the smartphone 1 increases the number of icons 50 to be displayed and reduces the display size of the icons 50. The smartphone 1 enlarges the display area of the home screen 40 while maintaining the layout pattern of the icons 50 within the home screen 40. The smartphone 1 enlarges the display area of the home screen 40 while adjusting the display so as to display the whole of the icons 50. Based on this, by enlarging the display area of the home screen 40, the smartphone 1 can increase the number of icons 50 to be displayed and reduce the display size of the icons 50. Therefore, for example, when an icon 50 being looked for is not the icon (1) or (5) at Step S21, then at Step S22, the user checks an overview of the icons (1) to (20) in the home screen 40 at Step S22 such as layout, color, text, and so on of the icons, so that he/she can check again whether the icon 50 being looked for is in the icons (1) to (20).

When the upward flick gesture is performed on the home screen 40 in which the display area of the home screen 40 is enlarged at Steps S22 to S23, the smartphone 1 moves downward the display area of the home screen 40 sheet by sheet corresponding to the size of the display area of the home screen 40 at Step S22, according to the value of the operation in the upward flick gesture. This enables the smartphone 1 to quickly move the display area of the home screen 40 at Step S22 sheet by sheet. Therefore, when the icon 50 being looked for is not any of the icons (1) to (20) at Step S22, then at Step S23, the user easily recognizes an overview of other icons (21) to (40), so that he/she can check whether the icon 50 being looked for is in the icons (21) to (40).

At Steps S23 to S24, the smartphone 1 reduces the display area of the home screen 40 according to the value of the operation in the pinch-out gesture performed on the home screen 40. Based on this, by reducing the display area of the home screen 40, the smartphone 1 can reduce the number of icons 50 to be displayed and enlarge the display size of the icons 50. Therefore, for example, when it is determined that the icon 50 being looked for is included in the icons (21) to (40) at Step S23, the user can limit the number of icons 50 being looked for and check the detail thereof in the display size of the icons 50 set so that the user can easily view.

Figure 8:
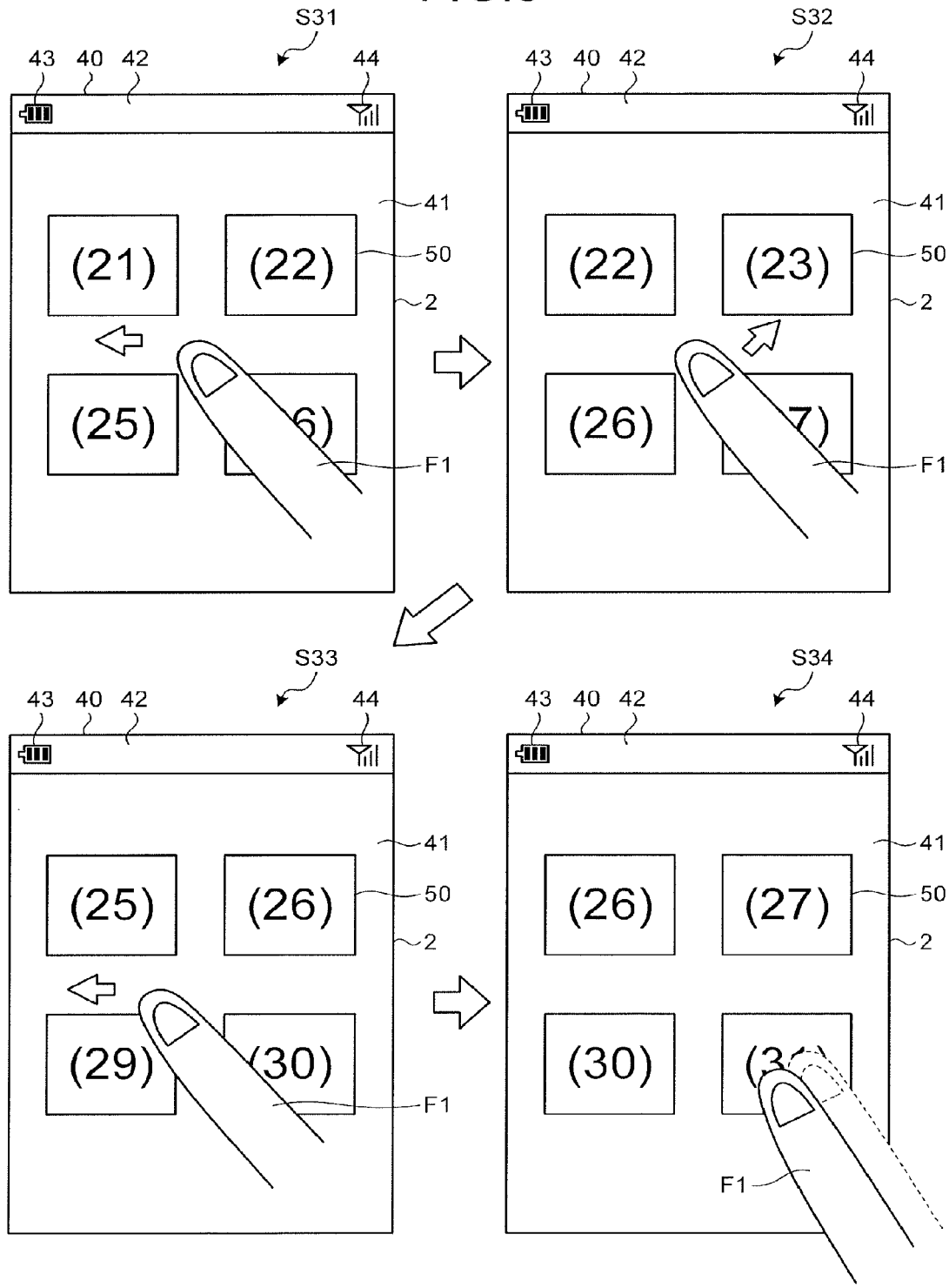
FIG. 8 is a diagram illustrating a third example of the control performed by the smartphone.

FIG. 8 is a diagram illustrating a third example of the control performed by the smartphone 1. At Step S31, the smartphone 1 displays the home screen 40 with 4 icons arranged in 2 columns×2 rows the same as that of Step S24 in FIG. 7 on the display 2A. At Step S31, the user swipes the finger F1 leftward on the home screen 40. When detecting the leftward swipe performed on the home screen 40, the smartphone 1 moves rightward the display area of the home screen 40 block by block corresponding to the size of each of the icons (21), (22), (25), and (26) arranged on the home screen 40 at Step S31, according to the value of the operation in the detected leftward swipe gesture.

At Step S32, the smartphone 1 displays the home screen 40 in which the display area of the home screen 40 is moved rightward block by block. The home screen 40 at Step S32 displays the icons (23) and (27), which are not displayed at Step S31, together with the icons (22) and (26).

At Step S32, the user swipes the finger F1 diagonally right upward on the home screen 40. When detecting the diagonally right upward swipe performed on the home screen 40, the smartphone 1 moves the display area of the home screen 40 diagonally left downward block by block corresponding to the size of the icons (22), (23), (26), and (27) arranged on the home screen 40 at Step S32, according to the value of the operation in the detected diagonally right upward swipe gesture.

At Step S33, the smartphone 1 displays the home screen 40 in which the display area of the home screen 40 is moved diagonally left downward block by block. The home screen 40 at Step S33 displays the icons (25), (29), and (30), which are not displayed at Step S32, together with the icon (26).

At Step S33, the user swipes the finger F1 leftward on the home screen 40. When detecting the leftward swipe performed on the home screen 40, the smartphone 1 moves rightward the display area of the home screen 40 block by block corresponding to the size of the icons (25), (26), (29), and (30) arranged on the home screen 40 at Step S33, according to the value of the operation in the detected leftward swipe gesture.

At Step S34, the smartphone 1 displays the home screen 40 in which the display area of the home screen 40 is moved rightward block by block. The home screen 40 at Step S34 displays the icons (27) and (31), which are not displayed at Step S33, together with the icons (26) and (30).

At Step S34, the user taps the finger F1 on the icon (31). When detecting the tap gesture as a gesture performed on the icon (31), the smartphone 1 executes an application associated with the icon (31).

At Steps S31 to S34, when a swipe gesture in each of directions is performed on the home screen 40 in which the display area of the home screen 40 is reduced, the smartphone 1 moves the display area of the home screen 40 in an opposite direction to the direction, in which the swipe gesture is detected, block by block corresponding to the size of the icons 50 arranged on the home screen 40 according to the value of the operation in the swipe gesture in each of the directions. This enables the smartphone 1 to move the display area of the home screen 40 with the finger block by block at each of Steps S31 to S34. Therefore, there may be a case in which it is determined that the icon 50 being looked for is included in the icons (21) to (40) at Step S23 in FIG. 7 but it is determined that the icon 50 is not in the icons (21), (22), (25), and (26) at Step S24. In this case, at Steps S31 to S34 in FIG. 8, because the display area of the home screen 40 can be slightly adjusted, the user can surely find the icon 50 being looked for.

At Step S34, when the tap gesture is performed on the icon 50 arranged on the home screen 40 in which the display area of the home screen 40 is reduced, the smartphone 1 executes an application associated with the icon 50. This enables the user to quickly execute an application associated with the found icon, thus further improving the operability of the home screen 40.

Figure 9:
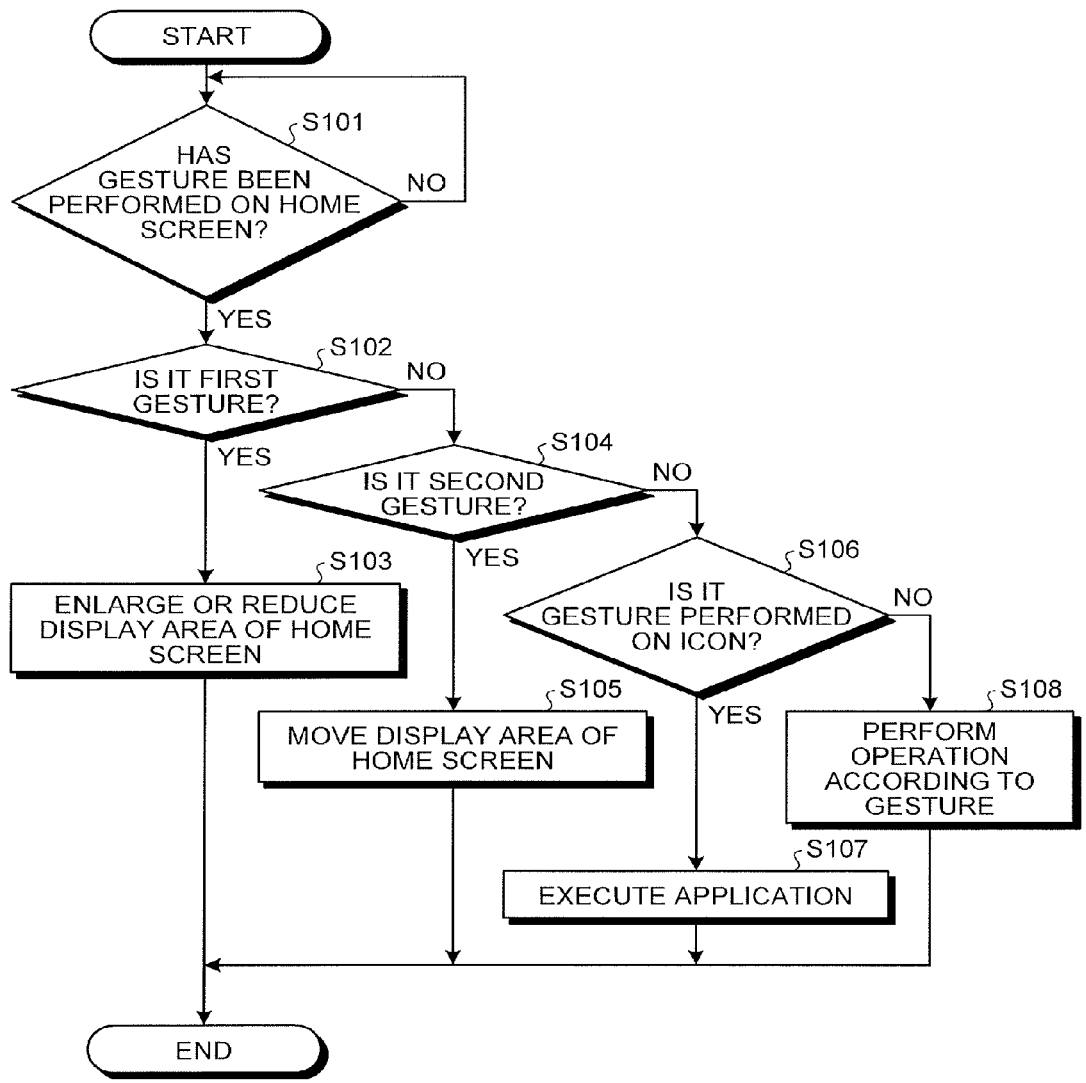
FIG. 9 is a flowchart illustrating a procedure of the control performed by the smartphone.

A procedure when the smartphone 1 changes the home screen 40 will be explained below with reference to FIG. 9. FIG. 9 is a flowchart illustrating control performed by the controller 10 of the smartphone 1. The controller 10 may execute another procedure in parallel with the procedure in FIG. 9. The following processes are assumed to be repeatedly executed.

At Step S101, the controller 10 of the smartphone 1 determines whether a gesture has been performed on the home screen 40. When it is determined that a gesture has not been performed on the home screen 40 (No at Step S101), then the controller 10 proceeds to Step S101. In this way, the controller 10 repeats the process at Step S101 until a gesture performed on the home screen is detected at Step S101.

When it is determined that a gesture has been performed on the home screen 40 (Yes at Step S101), then the controller 10 proceeds to Step S102. At Step S102, the controller 10 determines whether the gesture performed on the home screen 40 is a first gesture. The first gesture is, for example, a pinch-in gesture or a pinch-out gesture.

When it is determined that the gesture performed on the home screen 40 is the first gesture (Yes at Step S102), then the controller 10 proceeds to Step S103. At Step S103, the controller 10 enlarges or reduces the display area of the home screen 40 according to a value of the operation in the detected first gesture as illustrated in the first example and the second example. The controller 10 then ends a series of processes.

When it is determined that the gesture performed on the home screen 40 is not the first gesture (No at Step S102), then the controller 10 proceeds to Step S104. At Step S104, the controller 10 determines whether the gesture performed on the home screen 40 is a second gesture. The second gesture is, for example, a flick gesture or a swipe gesture.

When it is determined that the gesture performed on the home screen 40 is the second gesture (Yes at Step S104), then the controller 10 proceeds to Step S105. At Step S105, the controller 10 moves the display area of the home screen 40 according to a value of the operation in the second gesture and a movement direction thereof as illustrated in the second example and the third example. The controller 10 then ends the series of processes.

When it is determined that the gesture performed on the home screen 40 is not the second gesture (No at Step S104), then the controller 10 proceeds to Step S106. At Step S106, the controller 10 determines whether the gesture performed on the home screen 40 is a gesture performed on an icon 50. The gesture performed on the icon 50 is, for example, a tap gesture.

When it is determined that the gesture is the gesture performed on the icon 50 (Yes at Step S106), then the controller 10 proceeds to Step S107. At Step S107, the controller 10 executes an application associated with the corresponding icon 50 as illustrated in the third example. The controller 10 then ends the series of processes.

When it is determined that the gesture is not the gesture performed on an icon 50 (No at Step S106), then the controller 10 proceeds to Step S108. At Step S108, the controller 10 performs a predetermined operation according to the gesture performed on the home screen 40. The predetermined operation may be, for example, an operation of changing to an adjustment mode for changing a layout pattern of the icons 50. The controller 10 then ends the series of processes.

The embodiment disclosed in the present application can be modified without departing the gist and the scope of the invention. Moreover, the embodiments and their modifications disclosed in the present application can be combined with each other if necessary. For example, the embodiment may be modified as follows.

For example, the programs illustrated in FIG. 5 may be divided into a plurality of modules, or may be combined with any other program.

The first example to the third example may be arbitrarily combined with each other.

In the first example to the third example, when the display area of the home screen 40 displayed on the display 2A is enlarged or reduced, the smartphone 1 may change a display magnification of at least one of a picture and a text included in the icon 50 arranged on the home screen 40. For example, when the display area of the home screen 40 is enlarged, the smartphone 1 may set so as to enlarge only the display magnification of the text included in the icon 50 and so as not to change the display magnification of the picture. When the display area of the home screen 40 is reduced, the smartphone 1 may set so as to reduce only the display magnification of the picture included in the icon 50 and so as not to change the display magnification of the text. This enables the smartphone 1 to change the display magnification of the icons 50 according to whether the user recognizes an application by the picture of the icon 50 or according to whether the user recognizes an application by the text of the icon 50. Accordingly, the user can more easily find a desired icon 50.

Figure 6A:
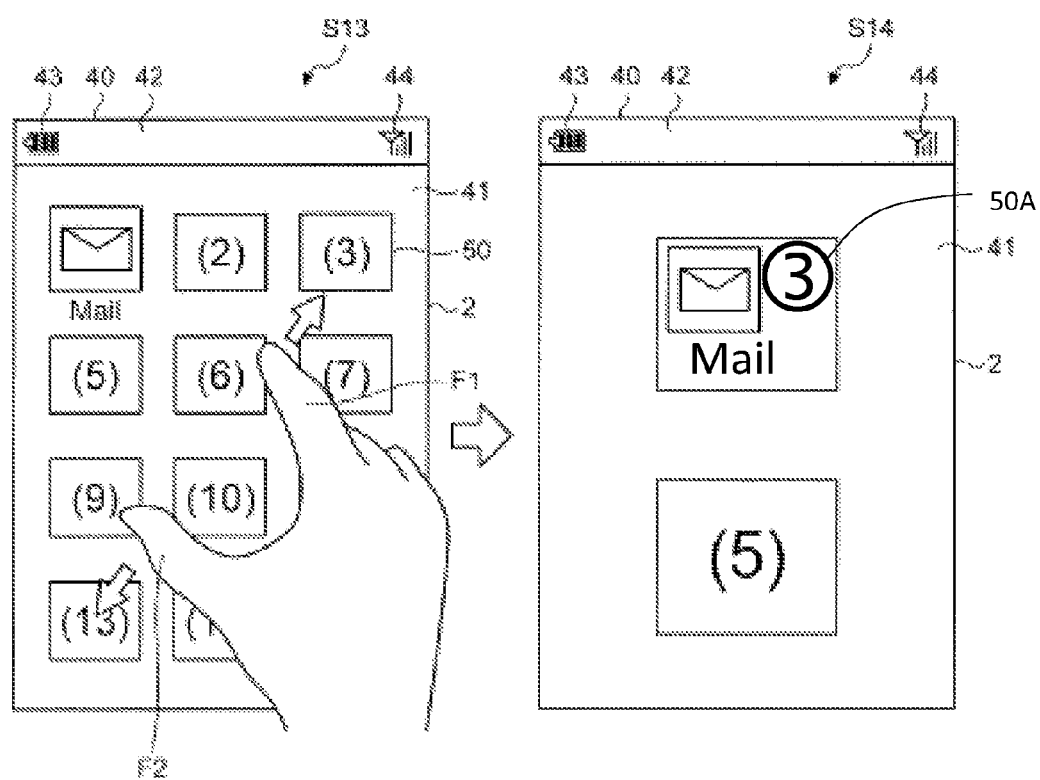
FIG. 6A is a diagram corresponding to a portion of FIG. 6A and illustrating the first example of control performed by the smartphone in accordance with some embodiments.

In the first example, when the display area of the home screen 40 displayed on the display 2A is enlarged or reduced, the smartphone 1 may change an amount of information related to an application to be displayed in the icon 50 according to the change in the size of the icons 50. For example, as illustrated at Step S14 in FIG. 6, when the size of the icons 50 is enlarged more than a predetermined threshold, the smartphone 1 may change the icon 50 to a widget of the application associated with the icon 50. As an example, if the application associated with the icon 50 is a calendar, the smartphone 1 may change the icon 50 to a widget that represents information indicating an overview of a substantial calendar with the enlargement of the icon 50. If the application associated with the icon 50 is microblogging software or mail application (e.g., as illustrated in FIG. 6A which includes Steps S13 and S14 of FIG. 6 with the exception that the icon (1) in FIG. 6 is illustrated more specifically as an icon for a mail application), the smartphone 1 may change the icon 50 to a widget (e.g., as illustrated at Step S14 in FIG. 6A) that represents information indicating a new message or an unread message (e.g., as illustrated at 50A in Step S14 in FIG. 6A) with the enlargement of the icon 50. When the size of the icon 50 changed to the widget is reduced more than the predetermined threshold, the smartphone 1 may control to return from the widget to the normal icon 50 (e.g., as illustrated at Step S13 in FIG. 6A). In the embodiment, the icon 50 may be changed to an icon image or an icon object capable of executing a predetermined process according to the change in the size. This enables the user to change the usage of the icon 50 by enlargement or reduction of the icon 50, thus improving the convenience of the home screen 40.

The first example to the third example have explained the case in which the icons 50 associated with the applications are arranged on the home screen 40 with no blank therebetween; however, the present invention is not limited thereto. The smartphone 1 may arbitrarily arrange, for example, a blank icon (null icon) which is not associated with any application and has substantially the same color as the background on the home screen 40. This enables the user to easily organize the icons 50 by arbitrarily inserting the blank icon, thus further improving the convenience of the home screen 40.

In the embodiment, the smartphone has been explained as an example of the device provided with the touch screen display; however, the device according to the appended claims is not limited to the smartphone. The device according to the appended claims may be a mobile electronic device other than the smartphone. Examples of the mobile electronic devices include, but are not limited to, mobile phones, tablets, mobile personal computers, digital cameras, media players, electronic book readers, navigators, and gaming devices. The device according to the appended claims may be a stationary-type electronic device. Examples of the stationary-type electronic devices include, but are not limited to, desktop personal computers, automatic teller machines (ATM), and television receivers.

Although the art of appended claims has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A device, comprising:
a touch screen display configured to
display a home screen where a plurality of icons are arranged, and
detect a first dynamic gesture over a partial area of the home screen displayed on the touch screen display; and
a controller configured to, responsive to detection of the first dynamic gesture, change an amount of information of the plurality of icons according to a change in a size of the plurality of icons,
wherein at least one icon among the plurality of icons includes a graphic and text,
wherein the controller is configured to, responsive to detection of the first dynamic gesture over an area of the home screen in which the at least one icon including the graphic and the text is arranged,
enlarge the at least one icon, and
change the enlarged at least one icon into a widget which displays an amount of information of text greater than an amount of information of the text included in the at least one icon, and
wherein the controller is further configured to, responsive to detection of a second dynamic gesture over an area of the home screen in which the widget is displayed,
reduce a size of the widget, and
change the reduced widget into the at least one icon.

2. A method of controlling a device with a touch screen display, the method comprising:
displaying a home screen where a plurality of icons are arranged on the touch screen display;
detecting a first dynamic gesture over a partial area of the home screen displayed on the touch screen display; and
responsive to detection of the first dynamic gesture, changing an amount of information of the plurality of icons according to a change in a size of the plurality of icons,
wherein at least one icon among the plurality of icons includes a graphic and text, wherein said changing, responsive to detection of the first dynamic gesture over an area of the home screen in which the at least one icon including the graphic and the text is arranged, includes
   enlarging the at least one icon, and
   changing the enlarged at least one icon into a widget which displays an amount of information of text greater than an amount of information of the text included in the at least one icon, and
wherein the method further comprises, responsive to detection of a second dynamic gesture over an area of the home screen in which the widget is displayed,
   reducing a size of the widget, and
   changing the reduced widget into the at least one icon.

\* \* \* \* \*